Patented Nov. 29, 1949

2,489,935

UNITED STATES PATENT OFFICE 2,489,935

5,5,5-TRICHLOROPENTYL PHENYL ETHERS

Norman E. Searle, Wilmington, Del., assignor to E. I. du Pont de Nemours & Company, Wilmington, Del., a corporation of Delaware No Drawing. Application August 16, 1946, Serial No. 691,168

3 Claims. (Cl. 260—609)

1

This invention relates to 5,5,5-trichloropentyl phenyl ethers and to insecticidal compositions and methods employing the compounds as an active toxicant.

The compounds of the invention may be represented by the formula

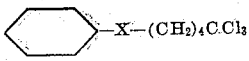

wherein X is a chalcogen of atomic weight less than thirty-three (33). Compounds represented by this formula are the ether, 5,5,5-trichloropentyl phenyl oxide or 5,5,5-trichloropentyl phenyl ether as it will be called hereinafter, and the corresponding thiol ether, 5,5,5-trichloropentyl phenyl sulfide.

It is an object of the invention to provide new compounds, and more particularly omega-trichloropentyl phenyl ethers. It is a further object to provide insecticidal compositions which are effective and economical to use. Another object is to provide methods for the control of insects. Still further objects will become apparent hereinafter.

The foregoing and other objects of the invention are attained by means of 5,5,5-trichloropentyl phenyl ethers and by insecticidal compositions and methods employing these compounds as active toxicants for the control of insect pests.

The 5,5,5-trichloropentyl phenyl ethers of this invention may be prepared by the reaction, preferably in an alkaline medium and a solvent of the polar type such as alcohol, acetone and the like, of a 5,5,5-trichloropentyl halide with a phenol of the formula

where X is a chalcogen as defined above.

The compounds of the invention, which are usually colorless oil, have definite insecticidal properties and may be employed as the active toxicants in insecticidal spray and dust compositions. In such compositions, 5,5,5-trichloropentyl phenyl ethers may be admixed with appropriate insecticidal adjuvants to provide compositions in the form of solutions in a suitable solvent, dust compositions, or slurries or emulsions in water.

Where a solution of the compounds of this invention in a solvent is desired, such as for use in fly spray compositions, the adjuvant may be a hydrocarbon solvent and is preferably a refined kerosene of the type known in the art as a fly spray base solvent. Other solvents, such as trichloroethylene, tetrachloroethylene, alkylated naphthalenes, xylene, toluene, cyclohexanone, and acetone, may be employed.

The adjuvant employed when a dust composition is desired is preferably selected from the class of finely divided solids comprising talcs, pyrophyllites, natural clays, and diatomaceous earths, such materials having an average particle size less than about 50 microns. Other adjuvants which may be used in dust compositions include such finely divided powders as calcium phosphate, calcium carbonate, magnesium carbonate, sulfur, lime, and flours such as walnut shell, wheat, redwood, soya bean, and cottonseed.

An insecticidal composition for use as a slurry dispersed in water is produced preferably in the form of a powder containing one of the adjuvants common to the dust compositions described above, said powder then being dispersed for actual usage in the water usually with the aid of an adjuvant such as a wetting, dispersing, or emulsifying agent. Typical of the adjuvants of this type are materials such as the sulfated higher alcohols, polyvinyl alcohols, polyethylene oxides, the alkali metal or amine salts of oleic acid, the sulfonated animal and vegetable oils, such as sulfonated fish and castor oils, the sulfonated petroleum oils, alkali metal salts of alkyl naphthalene sulfonic acids, and such proprietary preparations as are listed in detail in Bulletin E-607 of the Bureau of Entomology and Plant Quarantine of the U. S. Dept. of Agriculture.

If the insecticidal composition is desired in the form of a liquid to be used as a dispersion or emulsion in water, then it is preferred to prepare a relatively concentrated composition of the active agent dissolved in a suitable solvent selected according to the use to which it is to be put or to prepare an emulsion of the active agent in a non-solvent in certain cases where such technique is more applicable, said solution or emulsion subsequently being dispersed in water to permit suitable application. In substantially all compositions prepared for ultimate use as emulsions in water, the essential adjuvant is a wetting, dispersing, or emulsifying agent such as have been detailed above.

The compounds of the invention may also be incorporated in other standard insecticidal and fungicidal compositions either as the sole toxic ingredient or in combination with other parasitical toxicants, such as 2,2-bis(4-chlorophenyl)-1,1,1-trichloroethane, rotenone, pyrethrum, cryolite, organic thiocyanates, oils, sulfur, arsenates, and copper compounds.

The preferred amounts of 5,5,5-trichloropentyl phenyl ether incorporated in spray and dust compositions is between about 0.01 and 10 per cent by weight. Of course, concentrates of the active agent may be prepared containing larger amounts of the compound of the invention. Such concentrates may then be diluted with additional insecticidal adjuvants, such as set out above, or dispersed in water for application.

The invention is illustrated by the following examples:

Example 1

This example illustrates a suitable method for the preparation of 5,5,5-trichloropentyl phenyl ether.

A solution of sodium butylate prepared by dissolving 4.6 parts by weight of sodium in 120 parts by weight of dry butanol is added to a mixture of 42 parts by weight of 1,1,1,5-tetrachloropentane and 18.8 parts by weight of phenol and refluxed with stirring for 2 hours. The reaction mixture is poured into water, the oil separated with ether, and the ether layer extracted with 2 per cent sodium hydroxide followed by extraction with water until neutral. After drying over sodium sulfate, the product is vacuum distilled, yielding 34 parts by weight (64 per cent) of colorless oil boiling at 130–3°/3 mm. This product contains by analysis 38.37 per cent chlorine.

Example 2

This example illustrates a suitable method for the preparation of 5,5,5-trichloropentyl phenyl sulfide.

A mixture comprising 4 parts by weight of sodium hydroxide, 100 parts by weight of methanol, 11 parts by weight of thiophenol, and 30.2 parts by weight of 5,5,5-trichloropentyl iodide is refluxed with stirring for 4 hours. The reaction mixture is then poured into water, the oil separated with ether and the ether layer extracted with 2 per cent aqueous sodium hydroxide solution followed by extraction with water until neutral. After drying over sodium sulfate, the product is vacuum distilled, yielding 21 parts by weight (71 per cent) of colorless oil distilling at 164–6°/3 mm. This product contains by analysis 11.39 per cent sulfur as compared with the calculated value of 11.29 per cent.

Example 3

A solution of 1 part by weight of 5,5,5-trichloropentyl phenyl ether prepared according to the process of Example 1 in 79 parts by weight of acetone is thoroly mixed with 99 parts by weight of talc to form a paste. Upon evaporation of the acetone with good agitation, a homogeneous dust results which is suitable for dusting foliage to control effectively a wide variety of insects.

An effective insecticidal dust may be prepared similarly, of course, by using the thioether prepared according to the process of Example 2 instead of the 5,5,5-trichlorophentyl phenyl ether used in this example.

The proportions of this example may be varied to give dust compositions containing greater or lesser amounts of the active ingredient or the 1 per cent dust thus obtained may be diluted with talc simply by mechanical mixture therewith to provide a more dilute dust.

Example 4

Ten (10) parts by weight of the product of Example 2 and 1 part by weight of technical n-dodecyl alcohol is thoroughly mixed with 44.5 parts by weight of ground fuller's earth having an average particle size of about 40 microns. This mixture is then blended with 44.5 parts by weight of finely powdered talc to give a homogeneous powder. The powder is dispersible with water for application to foliage as a spray for the control of insect pests, such as Mexican bean beetle, red spider, and other insect pests.

The product of Example 1 may be used similarly instead of the thioether of this example to give satisfactory water dispersible powders.

The proportions of this example may be varied to give a less concentrated product, though in compositions of this type as high a concentration as possible is desirable consistent with a dry, free-flowing powder.

Example 5

The 5,5,5-trichloropentyl phenyl ether of Example 1 is dissolved in acetone to a concentration of 2.5 per cent by weight together with 0.25 per cent by weight of a wetting agent, the active agent of which is the sodium salt of sulfated oleyl acetate. This composition is suitable for dispersing in water to provide a contact insecticidal spray for the control of insect pests such as aphid.

5,5,5-trichloropentyl phenyl sulfide as prepared according to the teachings of Example 2 may be used satisfactorily in place of 5,5,5-trichloropentyl phenyl ether to prepare suitable compositions according to the teachings of this example.

The proportions may be varied to provide greater or less concentration of the active ingredient and other solvents or other wetting agents may be employed.

I claim:

1. A compound represented by the formula

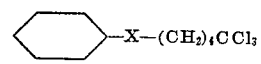

wherein X is a chalcogen of atomic weight less than thirty-three (33).

2. 5,5,5-trichloropentyl phenyl ether.
3. 5,5,5-trichloropentyl phenyl sulfide.

NORMAN E. SEARLE.

REFERENCES CITED

The following references are of record in the file of this patent:

UNITED STATES PATENTS

| Number | Name | Date |
|---|---|---|
| 1,819,132 | Spengler | Aug. 8, 1931 |
| 2,108,606 | Muller et al. | Feb. 15, 1938 |
| 2,303,683 | Coleman | Dec. 1, 1942 |
| 2,329,074 | Muller | Sept. 7, 1943 |
| 2,425,426 | Joyce | Aug. 12, 1947 |

OTHER REFERENCES

Bennet et al., J. Chem. Society (London) 1929, pp. 2567–2572, Abstracted in 24 Chem. Abst. 13396.

Gaubert et al., J. Chem. Society (London) 1937, pp. 1974–1979, abstracted in 32 Chem. Abst. 16533.